(12) United States Patent
Takeuchi et al.

(10) Patent No.: US 7,982,957 B2
(45) Date of Patent: Jul. 19, 2011

(54) OPTICAL APPARATUS USING A LENS ARRAY

(75) Inventors: Shinichi Takeuchi, Kawasaki (JP); Tamotsu Akashi, Kawasaki (JP); Hirofumi Aota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 11/822,947

(22) Filed: Jul. 11, 2007

(65) Prior Publication Data

US 2008/0013183 A1    Jan. 17, 2008

(30) Foreign Application Priority Data

Jul. 14, 2006 (JP) ................................. 2006-194682
Oct. 27, 2006 (JP) ................................. 2006-292063

(51) Int. Cl.
G02B 27/10 (2006.01)
G02B 6/32 (2006.01)

(52) U.S. Cl. .......................... 359/626; 359/619; 385/33

(58) Field of Classification Search .......... 359/618–619, 359/626, 637; 385/19, 37, 49, 51, 34, 33, 385/123, 124, 115, 116, 31
See application file for complete search history.

(56) References Cited

U.S. PATENT DOCUMENTS

| | | | | |
|---|---|---|---|---|
| 2,931,027 A | * | 3/1960 | Blefary et al. | 359/619 |
| 5,861,992 A | * | 1/1999 | Gelbart | 359/619 |
| 6,768,838 B2 | * | 7/2004 | Zhu | 385/34 |
| 6,847,761 B2 | * | 1/2005 | Hamanaka | 385/33 |
| 6,853,490 B2 | * | 2/2005 | Wang et al. | 359/621 |
| 2004/0032664 A1 | * | 2/2004 | Miller et al. | 359/619 |
| 2006/0165351 A1 | * | 7/2006 | Hamanaka et al. | 385/33 |
| 2006/0198583 A1 | * | 9/2006 | Oikawa et al. | 385/53 |

FOREIGN PATENT DOCUMENTS

WO   WO 00/20899   4/2000

OTHER PUBLICATIONS

D.T. Neilson et al., "Fully provisioned 112×112 micro-mechanical optical crossconnect with 35.8Tb/s demonstrated capacity," Optical Fiber Communications Conference (OFC 2000), Postdeadline paper PD-12, Mar. 2000.

* cited by examiner

*Primary Examiner* — Darryl J Collins
*Assistant Examiner* — Zachary Wilkes
(74) *Attorney, Agent, or Firm* — Staas & Halsey LLP

(57) ABSTRACT

In an optical apparatus according to the present invention, the lens thicknesses and curvature radiuses of respective first lenses are optimized so that beam waist positions of optical beams emitted from the respective first lenses of a lens array are independently changed according to aberration of a second lens, and the focal position deviation due to the aberration of the second lens is cancelled by a difference between the beam waist positions, which is given on the lens array side. As a result, it is possible to suppress, at a low cost, variations in focal positions of the optical beams which are emitted from respective ports of the lens array to be condensed by the common lens.

9 Claims, 6 Drawing Sheets

OVERALL VIEW OF CYLINDRICAL LENS

FIG.10

RELATED ART

FIG.11

RELATED ART

OPTICAL APPARATUS USING A LENS ARRAY

BACKGROUND OF THE INVENTION

1. Field of the Invention

The present invention relates to an optical apparatus using a lens array which is utilized for optical communications, and in particular to an optical apparatus in which optical beams emitted from respective ports of a lens array are condensed approximately on one point using a common lens.

2. Description of the Related Art

In recent years, with the speeding up of optical signals in trunk systems, an optical switching function in an optical cross-connecting apparatus or the like, is required to deal with optical signals of ultra-high speed exceeding 10, Gbps (gigabit per second). Further, with an increase in frequency of wavelength division multiplexing in a wavelength division multiplex (WDM) transmission technology, a scale of optical switching is becoming enormous.

In such a background, the development of an optical switch is now progressed, which uses a micro-tilt mirror array by the MEMS (Micro Electro Mechanical Systems) technology suitable for a large-scale optical switch (refer to a literature: "Fully provisioned 112×112, micro-mechanical optical crossconnect with 35.8, Tb/s demonstrated capacity" by D. T. Neilson et al., Optical Fiber Communications Conference (OFC 2000), Post-deadline paper PD-12, March 2000, and the pamphlet of International Patent Publication No. 00/20899).

Figure 10:
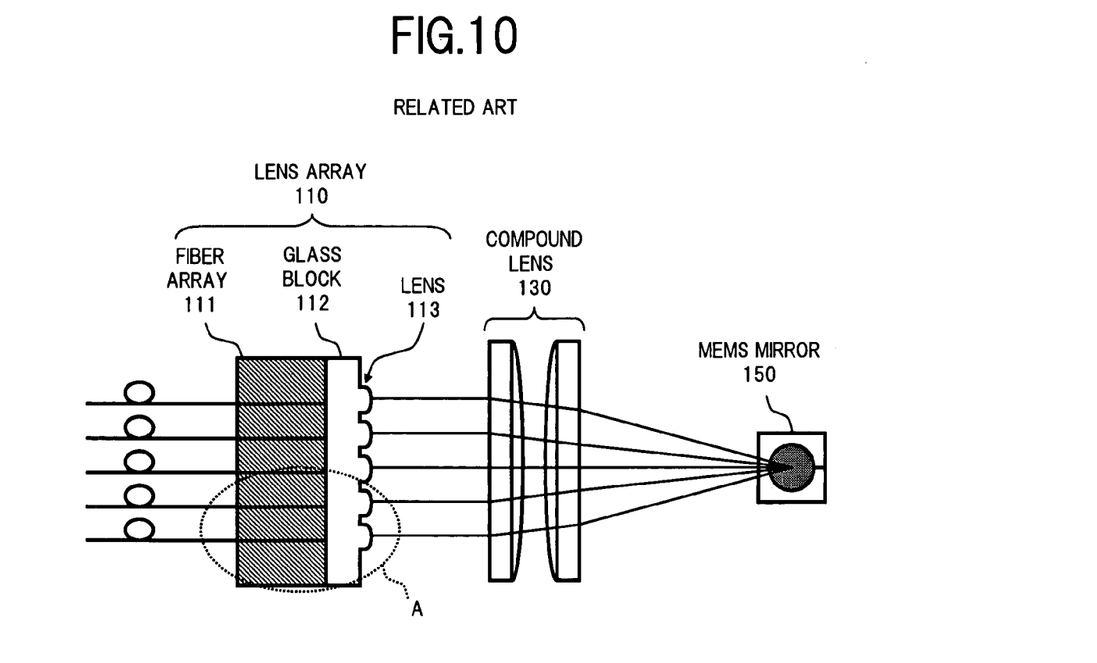
FIG. 10 is a diagram showing a configuration example of an optical switch using a conventional lens array.

FIG. 10 is a diagram showing a configuration example of an optical switch using a conventional lens array. Further, FIG. 11 is an enlarged diagram showing the vicinity of an A portion encircled by a dotted line in FIG. 10.

Figure 11:
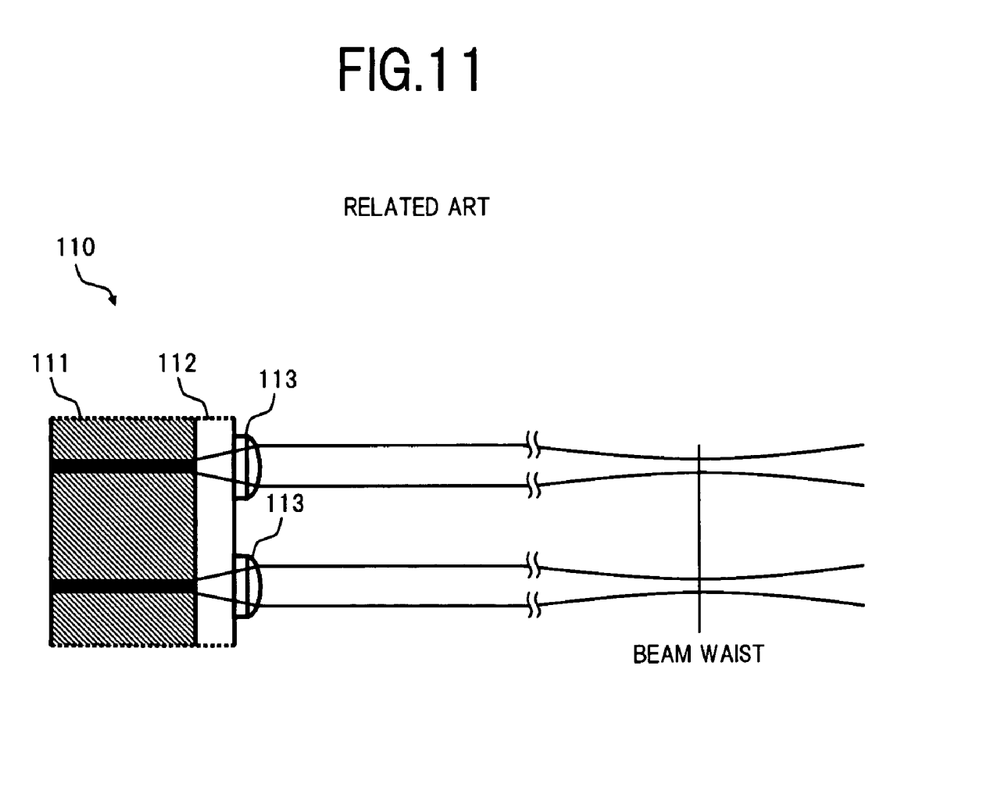
FIG. 11 is an enlarged diagram showing a configuration of the conventional lens array.

In FIG. 10 and FIG. 11, the optical switch comprises: a fiber array 111, a lens array 110 consisting of a glass block 112 and a plurality of lenses 113; and a compound lens 130 which condenses optical beams emitted from the lens array 110 on a MEMS mirror 150. In this optical switch, the optical beams emitted from the fiber array 111 are incident on the glass block 112, to travel through the glass block 112 while spreading. The optical beams passed through the glass block 112 are condensed respectively by the lenses 113 corresponding thereto, and here, become parallel beams for example. Then, the parallel beams emitted from the lenses 113 pass through the compound lens 130 to be condensed on the MEMS mirror 150. As a result, the optical beams emitted from arbitrary ports corresponding to the respective lenses 113 of the lens array 110 can be incident on different ports of the lens array 110 by tilting a mirror portion of the MEMS mirror 150, and therefore, it becomes possible to perform the changeover of optical paths.

However, in the case of attempting to realize a large scale optical switch using the conventional lens array 110 as described above, as the number of ports is increased, the variations in focal positions of the respective optical beams condensed by the compound lens 130 becomes large by an influence of aberration (for example, spherical aberration, curvature of field and the like) of each lens used for the compound lens 130. In the case where the dispersion occurs in the focal positions of the respective optical beams, a beam diameter on the MEMS mirror 150 is enlarged. Therefore, in order to absorb such an enlarged diameter, it is necessary to increase a size of the mirror portion of the MEMS mirror 150. However, if the size of the mirror portion is increased, there are caused problems in that a voltage for operating the mirror is increased, and further, in proportion to an increase in angle change of the mirror, the size of the overall optical switch is also increased.

For solving the above problems, it is considered that a lens of small aberration influence is used. However, such a lens is expense, and in the case of the compound lens 130 as shown in FIG. 10, since two lenses need to be used, there is caused a problem of resulting in a cost increase of the optical switch.

SUMMARY OF THE INVENTION

The present invention has been accomplished in view of the above problems and has an object to provide an optical apparatus using a lens array, capable of suppressing, at a low cost, the variations in focal positions of optical beams which are emitted from respective ports of the lens array to be condensed by a common lens.

In order to achieve the above object, an optical apparatus using a lens array according to the present invention comprises: a lens array including a plurality of optical paths and a plurality of first lenses capable of condensing respectively optical beams emitted from the optical paths; and a condensing section that condenses the optical beams emitted from the respective first lenses of the lens array approximately on one point using a common second lens, wherein the lens array has a structure in which beam waist positions of the optical beams emitted from the respective first lenses are independently changed according to aberration of the second lens.

Further, as a specific aspect of the optical apparatus, the lens array is preferably configured such that a distance from an optical emission end face of each of the optical paths to an optical emission end of each of the first lenses is independently set according to a relation between a distance from the center of the second lens and the aberration of the second lens, or a curvature radius of each of the first lenses is independently set according to the relation between the distance from the center of the second lens and the aberration of the second lens.

In the optical apparatus of such a configuration, the beam waist positions of the optical beams emitted from the respective first lenses of the lens array are independently optimized according to the aberration of the second lens used for the condensing section, so that the deviation in focal positions of the respective optical beams caused by the aberration of the second lens is corrected.

According to the present invention as described in the above, without the necessity of applying an expensive lens of small aberration influence to the condensing section, the optical beams emitted from arbitrary ports of the lens array can be condensed approximately on one point, and therefore, it becomes possible to achieve the cost down of the optical apparatus using the lens array.

The other objects, features and advantages of the present invention will be apparent from the following description of the embodiments with reference to the accompanying drawings.

DETAILED DESCRIPTION OF THE INVENTION

Hereinafter, embodiments for implementing the present invention will be described with reference to appended drawings. The same reference numerals denote the same or equivalent parts in all drawings.

Figure 1:
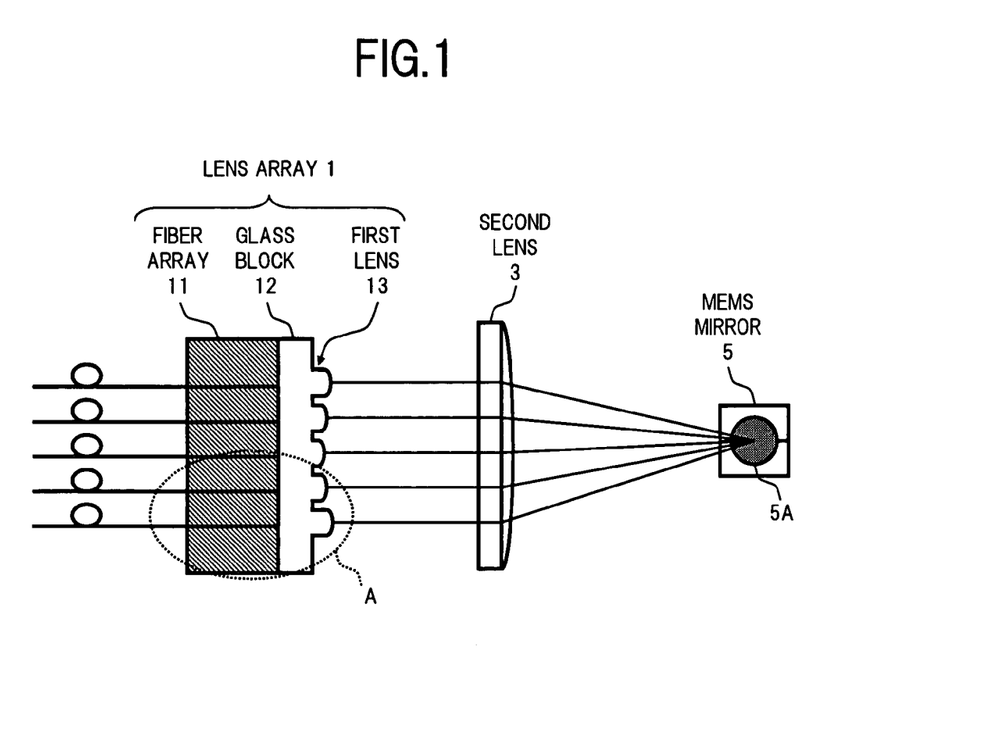
FIG. 1 is a diagram showing an entire configuration of a first embodiment of an optical apparatus using a lens array according to the present invention.

FIG. 1 is a diagram showing an entire configuration of a first embodiment of an optical apparatus using a lens array according to the present invention. Further, FIG. 2 is an enlarged diagram showing the vicinity of an A portion equivalent to two ports encircled by a dotted line in FIG. 1 in the lens array.

Figure 2:
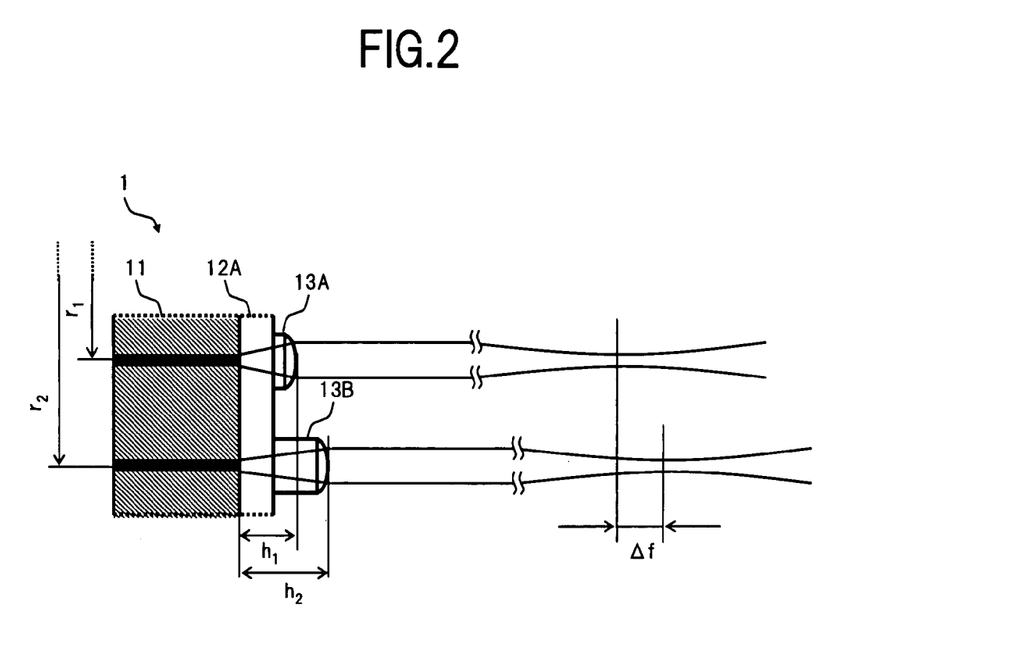
FIG. 2 is an enlarged diagram showing a configuration of the lens array in the first embodiment.

In FIG. 1 and FIG. 2, the optical apparatus in the first embodiment comprises, for example: a lens array 1 consisting of a fiber array 11, a glass block 12 and a plurality of first lenses 13; a second lens 3 on which respective optical beams emitted from the lens array 1 are incident; and a MEMS mirror 5 in which the optical beams condensed by the second lens 3 are irradiated on a mirror section thereof, and this optical apparatus functions as an optical switch.

The fiber array 11 has a configuration of multi-core optical fiber, and is configured such that, for example, a plurality of optical fibers are fixed by utilizing a V-groove substrate or the like, and respective end faces thereof are arranged on required positions. Note, here, there is shown the configuration example in which the plurality of optical fibers is arrayed. However, the present invention is not limited thereto, and it is also possible to use, for example, a substrate or the like on which a plurality of optical waveguides are formed on required position, in place of the fiber array 11.

The glass block 12 consists of a single glass plate 12A jointed to an optical emission end face of the fiber array 11, and the optical beams emitted from the respective optical fibers of the fiber array 11 are propagated through the glass plate 12A while spreading (refer to FIG. 2). The glass block 12 has a function of adjusting a transmission distance of each optical beam according to the thickness thereof, and also, a surface thereof opposite to the jointed surface to the fiber array 11 is used as a mounting surface for the respective first lenses 13 corresponding to the respective optical beams.

The respective first lenses 13 are lenses for condensing the optical beams transmitted through the glass plate 12A, and here, for example, collimator lenses each of which converts an incident beam into a substantially parallel light beam are fixed on the mounting surface of the glass plate 12A so as to correspond to arrival positions of the respective optical beams. Incidentally, the optical beam passed through each of the first lenses 13 becomes ideally the parallel light, and therefore, a beam waist (a point at which a beam diameter becomes minimum) shall not exist. However, due to the lens precision, a mounting state and the like, it is significantly hard to actually obtain a complete parallel beam, and therefore, it can be considered that a significant beam waist exists due to the slight deviation from the parallel light. A position of this beam waist (a distance of a tip end of the first lens 13 to the point at which the beam diameter becomes minimum) is changed, according to the thickness of the first lens 13, which contains the thickness of the glass plate 12A, and a curvature radius of the first lens 13. Paying attention to such a characteristic, here, as shown in FIG. 2, distances (to be referred to as "lens thickness" hereunder) $h_1$, and $h_2$, from the jointing surface of the fiber array 11 to the glass plate 12A, to tip ends of the first lenses 13A and 13B, are independently set, according to relations between distances $r_1$, and $r_2$, from the center of the second lens 3 and the aberration of the second lens 3.

Incidentally, here, there is shown one example in which the respective first lenses 13 are mounted on the surface of the glass plate 12A. However, the configuration may be such that the glass plate 12A and the respective first lenses 13 are integrally molded. In the case where the respective first lenses 13 are mounted on the glass plate 12A, there is an advantage in that an error due to the positional deviation or the like of the optical fibers in the fiber array 11 can be corrected with the mounting positions of the first lenses 13. However, it is not easy to mount the first lenses 13 on the glass plate 12A with high accuracy, and therefore, from the viewpoint of manufacturing facility, it is further advantageous to integrally mold the glass plate 12A and the first lenses 13.

The second lens 3 is a typical condenser lens for condensing, on a mirror portion 5A of the MEMS mirror, the optical beams emitted from the ports corresponding to the respective first lenses 13 in the lens array 1. This second lens 3 contains the aberration, and for example, even if focal distances and the like are designed so that the optical beams incident on the vicinity of the center of the lens 3 are condensed approximately on one point on the mirror portion 5A of the MEMS mirror 5, the deviation occurs, due to an influence of the aberration, in the focal position of the optical beam incident on a position apart from the center of the lens. However, the deviation in the focal position due to the aberration of the second lens 3 is corrected, since the beam waist positions of the respective optical beams emitted from the lens array 1 are independently changed according to this aberration. Accordingly, the optical beams passed through the second lens 3 are condensed approximately on one point on the mirror portion 5A of the MEMS mirror 5.

Incidentally, there are various types of aberration of the second lens 3. As the aberration causing the deviation in the focal positions which is correctable by independently changing the above beam waist positions, there are spherical aberration and curvature of field, for example. The spherical aberration is a phenomenon in which, when a light beam output from one point on an optical axis is incident on a lens, a position at which the light beam intersects the optical axis is different due to a distance from an incident position to the optical axis. Further, the curvature of field is a phenomenon in which, when a planar object is focused, a focal position is changed from the center of the lens to a concentric circle thereof.

The MEMS mirror 5 reflects the optical beams from the second lens 3 at the mirror portion 5A, to return them to the second lens 3. The mirror portion 5A having a reflecting surface of which angle is variable, leads the optical beams emitted from arbitrary ports of the lens array 1 to different ports of the lens array 1 according to the angle of the reflecting surface, to make the changeover of the optical paths possible.

In the optical switch of the above configuration, the optical beams emitted from the arbitrary optical fibers of the fiber array 11 are propagated through the glass block 12 while spreading, and thereafter, are condensed by the first lens 13 corresponding thereto, to become the substantially parallel light beams. Then, the optical beams emitted from the first lens 13 are condensed by the second lens 3 to be irradiated on the mirror portion 5A of the MEMS mirror 5. At this time, as shown in FIG. 2, since the lens thicknesses h1 and h2 corresponding to the first lenses 13A and 13B of the fiber array 11 are independently designed according to the relations between the distances $r_1$, and $r_2$, from the center of the second lens 3 and the aberration of the second lens 3, a difference of $\Delta f$ is caused in the beam waist positions of the optical beams emitted from the first lenses 13A and 13B. The difference $\Delta f$ in the beam waist positions functions to cancel the deviation in the focal positions of the optical beams condensed on the MEMS mirror 5 due to the aberration influence of the second lens 3. Therefore, the optical beams emitted from the arbitrary ports of the lens array 1 are all incident approximately on one point on the mirror portion 5A of the MEMS mirror 5, to be reflected, and are returned to the second lens 3 side. Thus, by controlling the angle of the reflecting surface of the MEMS mirror 5, the optical beams emitted from the arbitrary ports of the lens array 1 can be respectively incident on the desired ports of the lens array 1.

Figure 3:
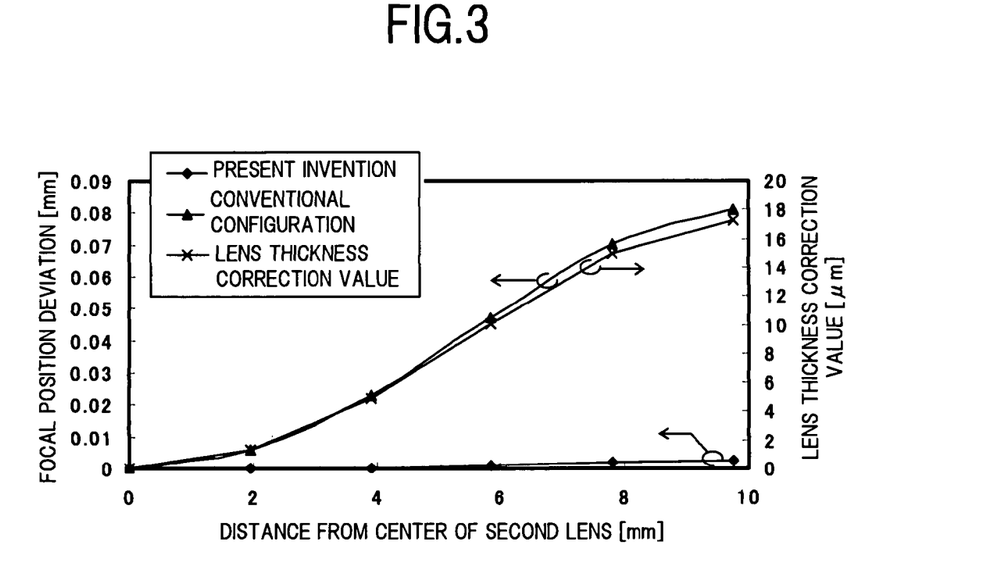
FIG. 3 is a graph showing a relation between the deviation in focal positions of respective optical beams and a distance from the center of a second lens.

FIG. 3 shows the relation between the deviation in the focal positions of the optical beams and the distance from the center of the second lens 3. Note, the filled triangle-mark in the figure represents the focal position deviation in the optical beams in a conventional configuration shown in FIG. 10, and the filled rectangle-mark represents the focal position deviation in the optical beams in the present embodiment. Further, the x-mark represents a lens thickness correction value (a difference of other lens thickness for when the lens thickness corresponding to the center of the second lens 3 is made reference) in the present embodiment. From FIG. 3, it is understood that the focal position deviation due to the aberration of the second lens 3 is effectively reduced, by optimizing the lens thickness according to the distance from the center of the second lens 3.

As described in the above, according to the first embodiment, by optimizing the lens thickness of each of the first lenses 13 so that the beam waist positions of the optical beams emitted from the respective ports of the lens array 1 are independently changed according to the aberration of the second lens 3, an increase of the beam diameter on the MEMS mirror 5 caused by the aberration of the second lens 3 can be suppressed, and therefore, it becomes possible to perform the changeover of the optical paths by driving the mirror portion of small size at a relatively low voltage. Further, the changing angle of the mirror is also small, and therefore, the size of the overall optical switch can be made small. Moreover, without the necessity of using an expensive lens of small aberration influence, the focal positions of the respective optical beams emitted from the lens array 1 can be made consistent with each other using a single low cost condenser lens, and therefore, it becomes possible to realize at a low cost the optical switch corresponding to a large scale channel change.

Next, there will be described a second embodiment of the present invention.

Figure 4:
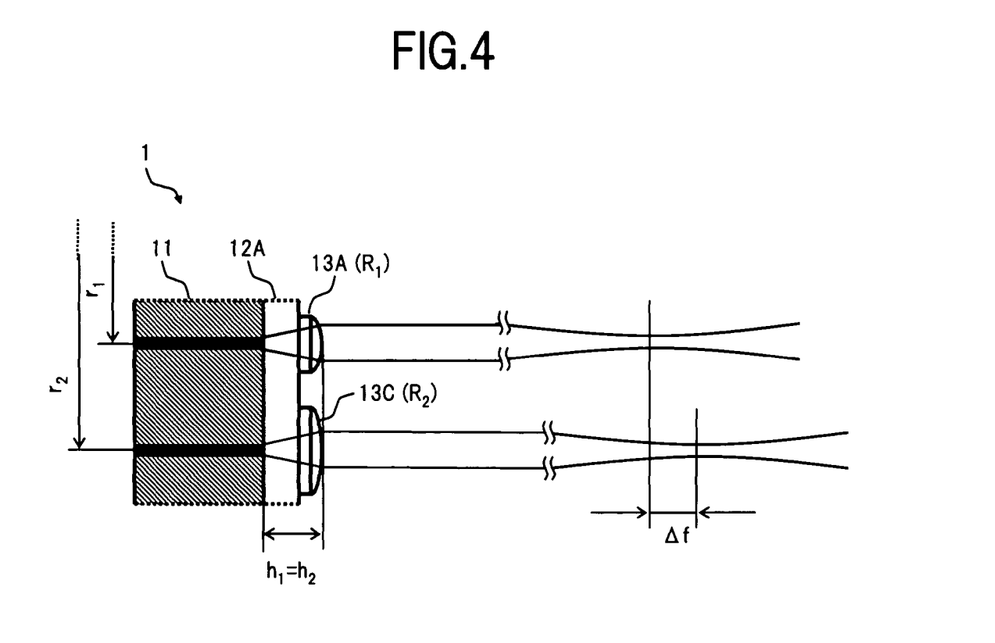
FIG. 4 is an enlarged diagram showing a configuration of the lens array in a second embodiment of the present invention.

FIG. 4 shows an enlarged diagram showing a configuration of the lens array in the second embodiment. Note, the overall configuration of the optical switch utilizing the lens array in FIG. 4 as an optical system, is similar to that shown in FIG. 1. The enlarged diagram of the lens array in FIG. 4 corresponds to the vicinity of the A portion in FIG. 1.

In FIG. 4, the lens array 1 used in the second embodiment is configured such that, in place of the first lens 13B in the configuration of the first embodiment shown in FIG. 2, a first lens 13C having a curvature radius $R_2$, larger than the curvature radius $R_1$, of the first lens 13A is used so that the lens thicknesses $h_1$, and $h_2$ respectively corresponding to the first lenses 13A and 13C are made equal to each other.

As described in the above, the beam waist positions of the optical beams emitted from the respective ports of the lens array 1 are changed according to the curvature radiuses of the first lenses 13. Therefore, in the present embodiment, the curvature radiuses $R_1$, and $R_2$, of the first lenses 13A and 13C are independently set according to the relations between the distances $r_1$, and $r_2$, from the center of the second lens 3 and the aberration of the second lens 3. As a result, it becomes possible to achieve a functional effect similar to that in the first embodiment where the lens thicknesses $h_1$, and $h_2$, are independently set.

Incidentally, in the first and second embodiments described above, one of the lens thicknesses $h_1$, $h_2$, and the curvature radiuses $R_1$, $R_2$, is made equal to each other, and the other is independently set. However, both of the lens thicknesses $h_1$, $h_2$, and the curvature radiuses $R_1$, $R_2$, may be independently set according to the aberration of the second lens 3.

Figure 5:
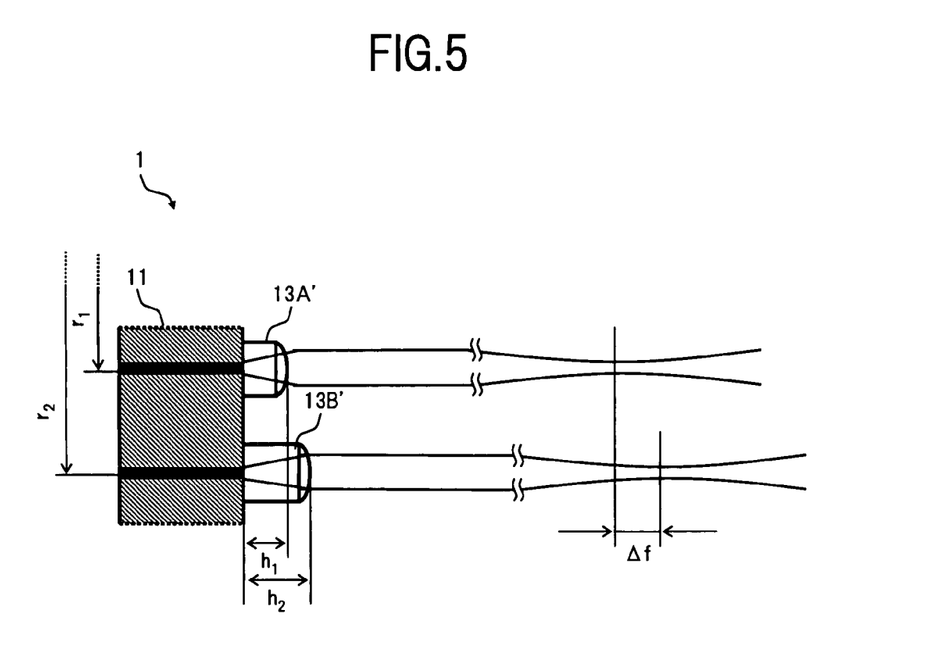
FIG. 5 is an enlarged diagram showing another configuration example of the lens array relating to the first and second embodiments.

Further, in each of the first and second embodiments described above, there has been shown the configuration example in which the transmission distances of the optical beams are adjusted using the glass plate 12A. However, as shown in FIG. 5 for example, if first lenses 13A' and 13B' each having the thickness equivalent to the glass plate can be prepared, it is also possible to omit the glass plate 12A. In this case, the first lenses 13A' and 13B' are mounted on the end face of the fiber array 11.

Furthermore, as an application example of the first and second embodiments, in the case where due to the manufacturing restriction of the respective first lenses 13 or the like, the difference $\Delta f$ of the beam waist positions corresponding to the aberration of the second lens 3 is hardly to be realized only by independently setting the lens thicknesses $h_1$, and $h_2$, and the curvature radiuses $R_1$ and $R_2$, the difference $\Delta f$ of the beam waist positions corresponding to the aberration of the second lens 3 may be realized by changing the arrangement of the respective optical fibers of the fiber array 11 and the mounting positions of the respective first lenses 13 of the fiber array 11, namely, by adjusting the distances $r_1$, and $r_2$, from the center of the second lens 3.

Next, there will be described modified examples of the lens array 1 in the first embodiment.

Figure 6:
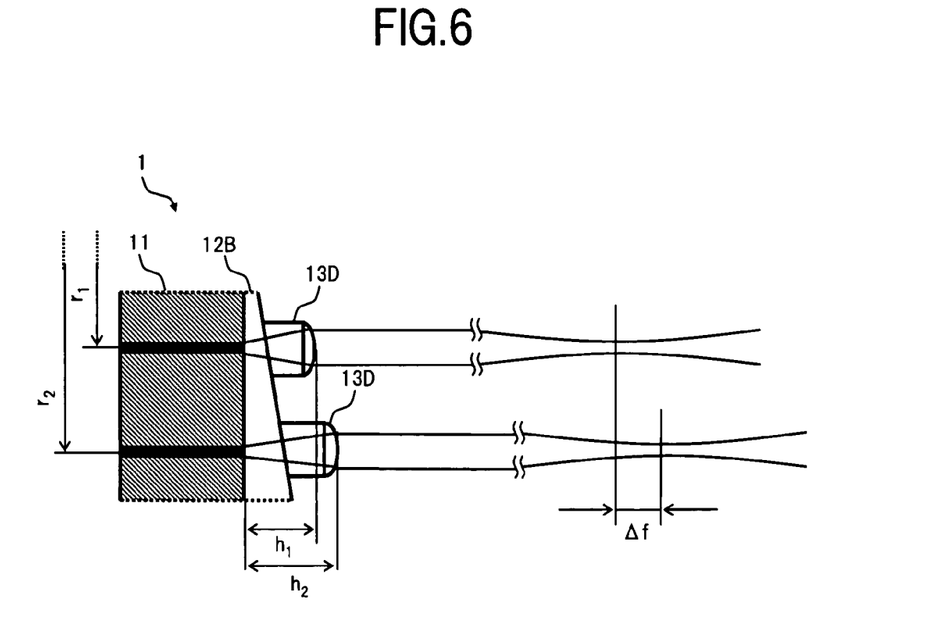
FIG. 6 is an enlarged diagram showing a configuration of a first modified example relating to the lens array in the first embodiment.

FIG. 6 is an enlarged diagram showing a configuration of the lens array 1 according to a first modified example.

In FIG. 6, the lens array 1 in the first modified example is configured such that, in place of the glass plate 12A in the configuration shown in FIG. 2, a glass block 12B having the inclined thickness, and first lenses 13D each of which bottom face is processed in conformity with the inclination of the glass block 12B are mounted on an inclined plane of the glass block 12B. The inclination of the glass block 12B is designed according to the aberration of the second lens 3, and the lens thicknesses $h_1$, and $h_2$, are independently changed depending on a difference in the thickness of the glass block 12B corresponding to the distances $r_1$, and $r_2$, from the center of the second lens 3. In such a configuration, there is an advantage in that the common first lenses 13D can be used irrespective of the distances $r_1$, and $r_2$, from the center of the second lens 3.

Figure 7:
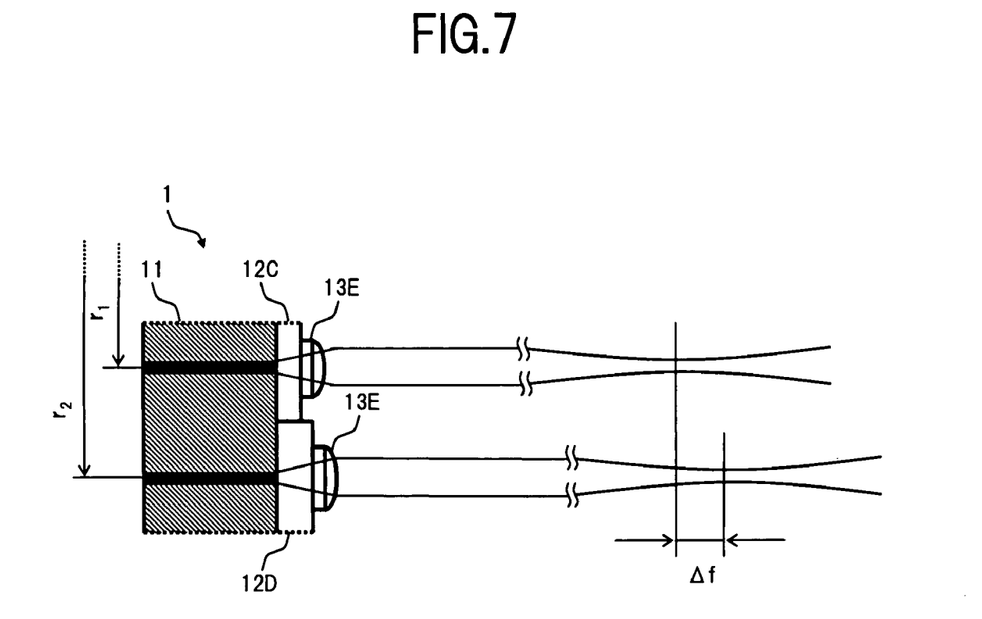
FIG. 7 is an enlarged diagram showing a configuration of a second modified example relating to the lens array in the first embodiment.

FIG. 7 is an enlarged diagram showing a configuration of the lens array 1 according to a second modified example.

In FIG. 7, the lens array 1 in the second modified example is configured such that, as a further modified example of the glass block 12B shown in FIG. 6, there are used glass plates 12C and 12D of which thicknesses are different from each other. The thicknesses of the glass plates 12C and 12D are designed according to the relations between the distances $r_1$, and $r_2$, from the center of the second lens 3, and the aberration of the second lens 3. In such a configuration, there is no longer necessary to make bottom faces of first lenses 13E to be inclined, and therefore, there is an advantage in that the manufacturing and mounting of the respective first lenses 13E are easily performed. Note, herein, the glass plates 12C and 12D of which thicknesses are different from each other are independently disposed. However, the configuration may be such that steps according to the aberration of the second lens 3 are disposed on a surface of one glass plate.

Figure 8:
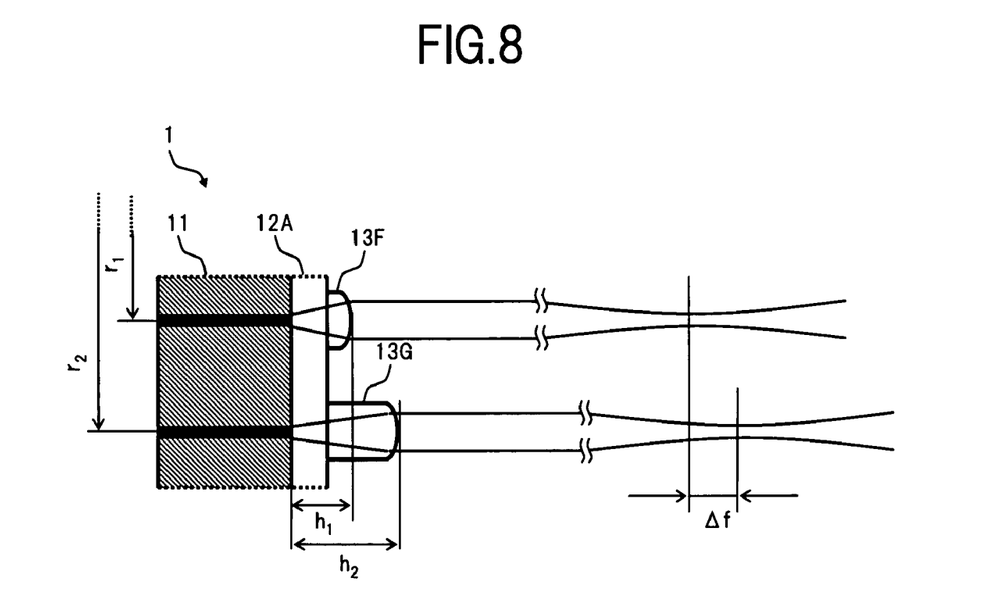
FIG. 8 is an enlarged diagram showing a configuration of a third modified example relating to the lens array in the first embodiment.

FIG. 8 is an enlarged diagram showing a configuration of the lens array 1 according to a third modified example.

Figure 9:
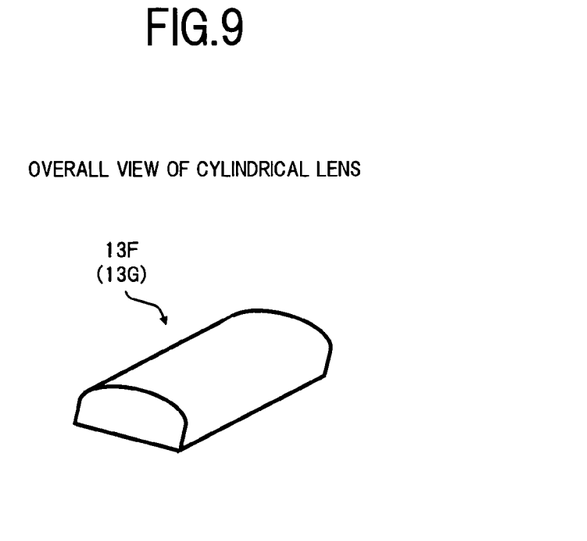
FIG. 9 is a diagram showing an entire configuration of a cylindrical lens used in the third modified example.

In FIG. 8, the lens array 1 in the third modified example is configured such that, as the first lenses 13A and 13B in the configuration shown in FIG. 2, cylindrical lenses 13F and 13G are used. Each of the cylindrical lenses 13F and 13G having a shape shown in FIG. 9 has a characteristic of condensing an incident beam to a one-dimensional direction. Even in the case where the optical beams propagated through the glass plate 12A while spreading are condensed to one direction using such cylindrical lenses 13F and 13G, it is possible to correct the focal position deviation in the optical beams due to the aberration of the second lens 3, by independently setting the lens thicknesses $h_1$, and $h_2$, corresponding to the cylindrical lenses 13F and 13G according to the aberration of the second lens 3.

Incidentally, in each of the first and second embodiments and in each of the first to third modified examples, there has been described the case where the lens array 1 and the second lens 3 are utilized as the optical system of the optical switch using the MEMS mirror 5. However, the optical apparatus using the lens array according to the present invention is not limited to the optical switch. The configuration of the present invention is effective for, for example, an optical receiver in which a light receiving element is arranged in place of the MEMS mirror in the configuration of FIG. 1, an optical sender in which a light emitting element of which light emitting direction is variable is arranged, or the like.

Further, there has been shown the configuration example in which the optical beams emitted from the respective ports of the lens array are condensed approximately on one point using one lens. However, the present invention is effective for the case where the optical beams are condensed by two or more combined lenses. In this case, the beam waist positions of the optical beams emitted from the respective ports of the lens array may be independently set according to the aberration of the overall combined lenses.

What is claimed is:

1. An optical apparatus using a lens array comprising: a lens array including a fiber array having a plurality of optical fibers and a plurality of first lenses capable of condensing respectively optical beams emitted from said optical fibers; and a condensing section that condenses the optical beams emitted from said respective first lenses of said lens array approximately on one point using a common second lens, wherein said lens array has a structure in which beam waist positions of the optical beams emitted from said respective first lenses are independently changed according to aberration of said second lens, and in said lens array, a distance from an optical emission end face of each of said optical fibers to an optical emission end of each of said first lenses, and a curvature radius of each of said first lenses, are independently set according to a relation between a distance from the center of said second lens and the aberration of said second lens, so that the curvature radius of each of said first lenses has a different value, and distances from the center of said second lens to said respective optical fibers are adjusted according to the aberration of said second lens by changing an arrangement of said respective optical fibers of said fiber array and mounting positions of said respective first lenses.

2. An optical apparatus according to claim 1,
wherein the fiber array is formed of multi-core optical fiber; and said lens array further includes a glass block jointed to an optical emission end face of said fiber array; and the plurality of first lenses are mounted on a surface of said glass block, which is opposite to the jointed surface to said fiber array, corresponding to arrival positions of the optical beams which are emitted from said fiber array to be transmitted through said glass block, said glass block has a thickness which is constant from the jointed surface to said fiber array, to the mounting surface of said respective first lenses, and in each of said respective first lenses, the thickness from a bottom face thereof in contact with said glass block to the optical emission end thereof is independently set according to the relation between the distance from the center of said second lens and the aberration of said second lens.

3. An optical apparatus according to claim 1,
wherein the fiber array is formed of multi-core optical fiber; and said lens array further includes a glass block jointed to an optical emission end face of said fiber array; and the plurality of first lenses are mounted on a surface of said glass block, which is opposite to the jointed surface to said fiber array, corresponding to arrival positions of the optical beams which are emitted from said fiber array to be transmitted through said glass block, in said glass block, the thickness from the jointed surface to said fiber array to the mounting surface of said respective first lenses is independently set according to the relation between the distance from the center of said second lens and the aberration of said second lens, and each of said respective first lenses has the thickness which is constant from a bottom face thereof in contact with said glass block to the optical emission end thereof.

4. An optical apparatus according to claim 1,
wherein the fiber array is formed of multi-core optical fiber and said plurality of first lenses are mounted on an optical emission end face of said fiber array, and in each of said respective first lenses, the thickness from a bottom face in contact with said fiber array to the optical emission end thereof is independently set according to the relation between the distance from the center of said second lens and the aberration of said second lens.

5. An optical apparatus according to claim 1,
wherein the aberration of said second lens is spherical aberration or curvature of field.

6. An optical apparatus according to claim 1,
wherein said respective first lenses are cylindrical lenses.

7. An optical apparatus according to claim 1, further comprising;

a movable mirror which is irradiated with the optical beams condensed approximately on one point by said condensing section on a reflecting surface thereof of which angle is variable, wherein the angle of the reflecting surface of said movable mirror is controlled so that the optical beams emitted from arbitrary ports of said lens array are incident on different ports, to thereby perform the changeover of the optical fibers.

8. An optical apparatus according to claim 1, further comprising;
a light receiving element which is irradiated with the optical beams condensed approximately on one point by said condensing section on a light receiving surface thereof, wherein the optical beams emitted from arbitrary ports of said lens array are received by said light receiving element.

9. An optical apparatus according to claim 1, further comprising;
a light emitting element of which light emitting direction is variable, wherein a light emitted from said light emitting element is transmitted to an arbitrary port of said lens array via said condensing section.

* * * * *